US008780421B2

(12) United States Patent
Nakanishi et al.

(10) Patent No.: US 8,780,421 B2
(45) Date of Patent: Jul. 15, 2014

(54) IMAGE READING APPARATUS AND IMAGE FORMING APPARATUS INCLUDING THE SAME (75) Inventors: Kenji Nakanishi, Osaka (JP); Hiroshi Nakatani, Osaka (JP); Hisashi Yamanaka, Osaka (JP); Shohichi Fukutome, Osaka (JP); Yoshihisa Yamada, Osaka (JP); Masahiro Imoto, Osaka (JP); Yasuhiro Suto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 318 days.

(21) Appl. No.: 13/177,235

(22) Filed: Jul. 6, 2011

(65) Prior Publication Data

US 2012/0008155 A1 Jan. 12, 2012

(30) Foreign Application Priority Data

Jul. 12, 2010 (JP) ................................. 2010-158066

(51) Int. Cl.
*H04N 1/40* (2006.01)

(52) U.S. Cl.
USPC .......................................... 358/498; 358/488

(58) Field of Classification Search
USPC .................. 358/1.9, 2.1, 496–498, 488, 468, 358/482–484, 400, 406, 500, 504, 506, 358/513; 250/216, 239, 234–236; 382/312–315

See application file for complete search history.

(56) References Cited

U.S. PATENT DOCUMENTS

| 7,508,554 B2 | 3/2009 | Tomita et al. |
| 2004/0165226 A1 | 8/2004 | Tomita et al. |
| 2007/0019253 A1* | 1/2007 | Huang .......................... 358/474 |

FOREIGN PATENT DOCUMENTS

| EP | 1067758 A2 * | 1/2001 |
| JP | 06-328585 | 11/1994 |
| JP | 09-093405 | 4/1997 |
| JP | 2003-075937 | 3/2003 |
| JP | 2005-191795 | 7/2005 |
| JP | 2006-203621 | 8/2006 |
| JP | 2009-271456 | 11/2009 |
| WO | 03/084210 A1 | 10/2003 |

\* cited by examiner

*Primary Examiner* — Thomas D Lee
*Assistant Examiner* — Stephen M Brinich
(74) *Attorney, Agent, or Firm* — Renner, Otto, Boisselle & Sklar, LLP (57) ABSTRACT

A transparent sheet is attached onto an inclined surface of an original guide plate of an image reading apparatus, and similarly, a transparent sheet is attached onto an inclined surface at an edge portion of a reading guide plate, thereby preventing an original from being chipped by the ground glass-like inclined surfaces and illumination light from being diffused by the ground glass-like inclined surfaces.

10 Claims, 8 Drawing Sheets

IMAGE READING APPARATUS AND IMAGE FORMING APPARATUS INCLUDING THE SAME

CROSS-REFERENCE TO RELATED APPLICATION

This application claims priority under 35 U.S.C. §119(a) on Patent Application No. 2010-158066 filed in Japan on Jul. 12, 2010, the entire contents of which are herein incorporated by reference.

BACKGROUND OF THE INVENTION

1. Field of the Invention

The present invention relates to an image reading apparatus that reads an original by illuminating the original, and an image forming apparatus including the image reading apparatus.

2. Related Art

An image reading apparatus of this type reads an original, and is used independently or being provided in a copier or the like. When used independently, the read original image is outputted to an external printer or the like, and when used being provided in a copier, the read original image is copied by the copier.

Such an image reading apparatus is provided with an original guide plate made of, for instance, a glass plate having translucency and a reading scanner disposed under the original guide plate, and reads an original on the original guide plate by illuminating the original using the reading scanner while transporting the original so as to cause the original to pass over the original guide plate. The reading scanner has a light source that illuminates an original, and an image sensor (such as a CCD) that photoelectrically converts the light reflected from the original.

Here, if the transported original is caught at an edge portion of the original guide plate, a jam occurs. Accordingly, an inclined surface (C surface (chamfer surface)) is formed at the edge portion of the original guide plate, thereby promptly guiding the original from the inclined surface at the edge portion of the original guide plate onto the upper surface of the original guide plate.

However, the inclined surface of the original guide plate is ground glass-like, and thus the original is chipped by the ground glass-like inclined surface, thereby generating a large amount of paper powder, or the illumination light from the reading scanner is diffused by the ground glass-like inclined surface, thereby causing an insufficiency of the illumination light for the original.

For example, in JP H09-93405A, the unevenness and insufficiency of illumination light is prevented by polishing a C surface of a transparent original stage until it becomes transparent. If the C surface of the original stage is polished until it becomes transparent, the original will not be chipped by the C surface.

However, if the C surface of the original stage is polished until it becomes transparent as in JP H09-93405A described above, the cost of the original stage is greatly increased. This is because the C surface of the original stage is originally ground glass-like, and thus a polishing process and a time period for this process will be separately necessary in order to polish the C surface until it becomes transparent.

SUMMARY OF THE INVENTION

The present invention has been conceived in light of the above conventional problems, and an object thereof is to provide an image reading apparatus having a transparent and smooth inclined surface (C surface) at an edge portion of an original guide plate, which can be easily achieved at low cost, and an image forming apparatus including the same.

An image reading apparatus of the present invention is an image reading apparatus comprising: a first translucent plate over which an original is transported and caused to pass; and an image reading portion that reads the original by illuminating the original via the first translucent plate; wherein a first inclined surface for guiding the transported original to an upper surface of the first translucent plate is formed so as to be ground glass-like at an edge portion of the first translucent plate, and a transparent sheet is attached onto the first inclined surface with interposition of a transparent adhesive or a transparent double-sided tape.

When the transparent sheet is attached onto the ground glass-like inclined surface at the edge portion of the first translucent plate as described, which results in a state in which a transparent adhesive has been applied onto the ground glass-like inclined surface, the ground glass-like inclined surface becomes transparent, thereby preventing illumination light from being diffused at this site of the inclined surface. Further, when an original passes over the inclined surface at the edge portion of the first translucent plate, since the original comes into contact with the transparent sheet without coming into direct contact with the ground glass-like inclined surface, the original will not be chipped by the ground glass-like inclined surface, and thus no paper powder will be generated.

The image reading apparatus of the present invention may further include a second translucent plate that forms a pair with the first translucent plate, wherein a second inclined surface may be formed so as to be ground glass-like at an edge portion of a lower surface of the second translucent plate, a transparent sheet may be attached onto the second inclined surface with interposition of a transparent adhesive or a transparent double-sided tape, and the first translucent plate and the second translucent plate may be arranged in opposition at a distance from each other, and the original may be transported and caused to pass between the first translucent plate and the second translucent plate.

In this way, the present invention is also applicable to a configuration in which an original is transported and caused to pass between the pair of translucent plates.

In the image reading apparatus of the present invention, illumination light of the image reading portion may pass through at least one of the first inclined surface and the second inclined surface, and illuminate the original or a white reference member for shading correction that faces the first translucent plate.

As described above, since the ground glass-like inclined surface becomes transparent, even if illumination light that illuminates an original or the white reference member passes through the inclined surface or surfaces, the illumination level at the original and at the white reference member is prevented from being insufficient.

Furthermore, in the image reading apparatus of the present invention, the transparent sheet may be attached, being separated from a boundary line between the upper surface and the first inclined surface of the first translucent plate by a predetermined interval, and the transparent sheet may be attached, being separated from a boundary line between the lower surface and the second inclined surface of the second translucent plate by the predetermined interval.

In the case where the transparent sheet is attached, being separated from the boundary line between the upper surface and the first inclined surface of the first translucent plate by the predetermined interval as described, even if the adhesive on the transparent sheet exudes, the adhesive will not reach the upper surface of the first translucent plate over the boundary line, and thus the upper surface of the first translucent plate will not be smeared with the adhesive.

An image forming apparatus of the present invention includes the above image reading apparatus of the present invention, and thus achieves equivalent effects.

In the present invention, as described, when the transparent sheet is attached onto the ground glass-like inclined surface at the edge portion of the translucent plate, which results in a state in which a transparent adhesive has been applied onto the ground glass-like inclined surface, the ground glass-like inclined surface becomes transparent, thereby preventing illumination light from being diffused at this site of the inclined surface. Further, when an original passes over the inclined surface at the edge portion of the translucent plate, since the original comes into contact with the transparent sheet without coming into direct contact with the ground glass-like inclined surface, the original will not be chipped by the ground glass-like inclined surface, and thus no paper powder will be generated.

BRIEF DESCRIPTION OF THE DRAWINGS

FIG. 5(*a*) is a cross-sectional view showing an enlarged periphery of an original guide plate and a reading guide plate in the image reading apparatus in FIG. 2, and FIG. 5(*b*) is a cross-sectional view showing an original that is passing between the original guide plate and the reading guide plate.

FIG. 6(*a*) is a diagram showing incident light on and reflected light from a ground glass-like inclined surface, and FIG. 6(*b*) is a diagram showing incident light entering the inclined surface on which a transparent sheet is attached.

FIG. 7(*a*) is a cross-sectional view showing an enlarged modified example of a configuration in which the original guide plate and the reading guide plate are arranged in the image reading apparatus in FIG. 2, and FIG. 7(*b*) is a cross-sectional view showing an original that is passing between the original guide plate and the reading guide plate.

FIGS. 8(*a*) and 8(*b*) are a lateral view and a front view showing an enlarged state in which the transparent sheet adheres to the inclined surface of the original guide plate.

DESCRIPTION OF PREFERRED EMBODIMENTS

The following is a detailed description of an embodiment of the present invention with reference to accompanying drawings.

Figure 1:
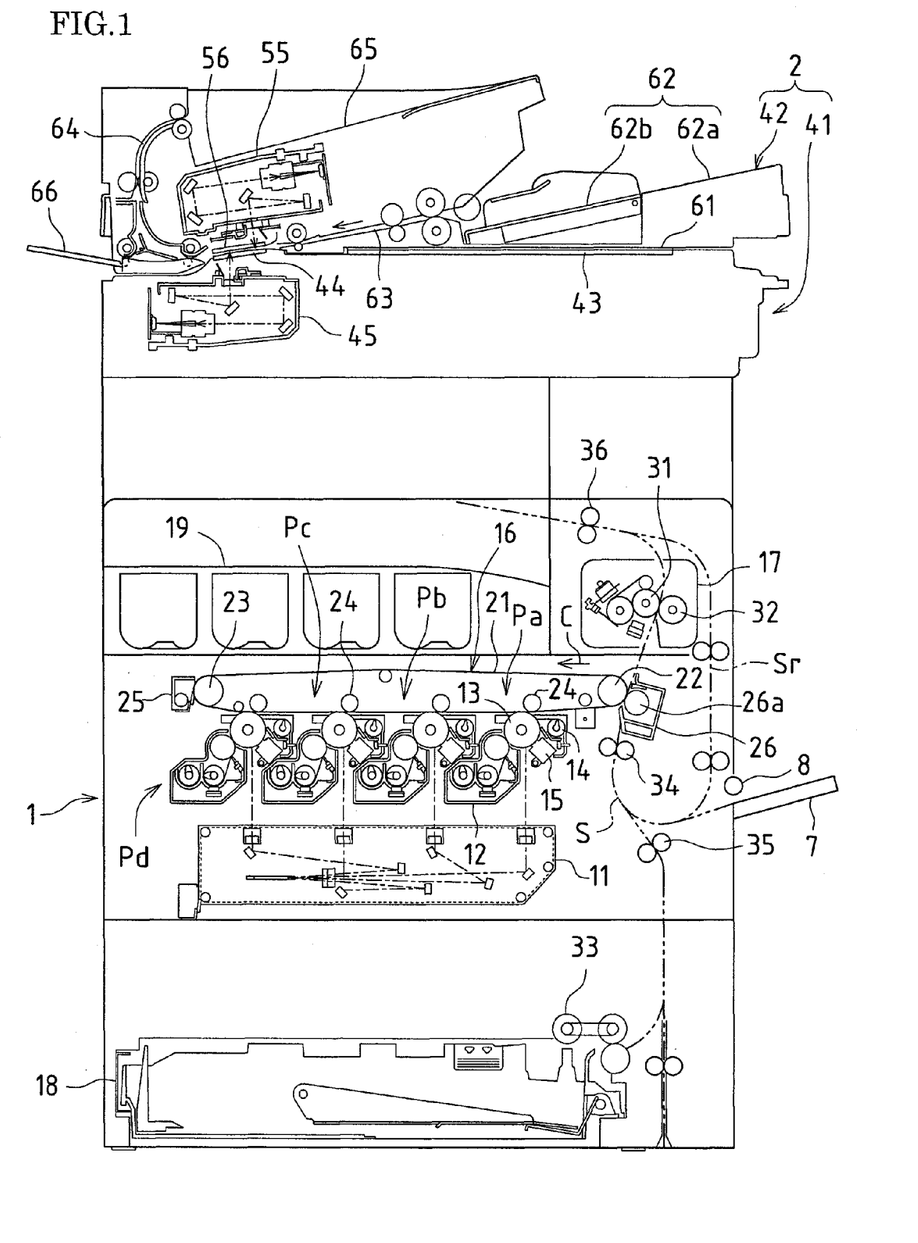
FIG. 1 is a cross-sectional view showing an image forming apparatus to which a first embodiment of an image reading apparatus of the present invention is applied.

FIG. 1 is a cross-sectional view showing an image forming apparatus to which a first embodiment of an image reading apparatus of the present invention is applied. This image forming apparatus 1 is a so-called multi-function peripheral that has a scanner function, a copying function, a printer function, a facsimile function, and the like, transmits an image of an original read by an image reading apparatus 2 to the outside (which corresponds to the scanner function), and records and forms the read original image or an image received from the outside in color or monochrome on recording paper (which corresponds to the copying function, the printer function, and the facsimile function).

In order to print an image on recording paper, the image forming apparatus 1 is provided with a light scanning apparatus 11, development apparatuses 12, photosensitive drums 13, drum cleaning apparatuses 14, charging units 15, an intermediate transfer belt apparatus 16, a fixing apparatus 17, a paper transport path S, a paper feed tray 18, a paper discharge tray 19, and so on.

Image data handled in the image forming apparatus 1 corresponds to a color image using black (K), cyan (C), magenta (M), and yellow (Y), or corresponds to a monochrome image using a single color (for example, black). Accordingly, four each of the development apparatuses 12, the photosensitive drums 13, the drum cleaning apparatuses 14, and the charging units 15 are provided such that four types of toner images corresponding to the colors are formed, with these being respectively associated with black, cyan, magenta, and yellow, thereby constituting four image stations Pa, Pb, Pc, and Pd.

The photosensitive drums 13 each have a photosensitive layer on the surface thereof. The charging units 15 serve as charging means for respectively charging the surface of the photosensitive drums 3 uniformly to a predetermined potential, and contact roller-type or contact brush-type charging units, or otherwise charger-type charging units are used.

The light scanning apparatus 11 is a laser scanning unit (LSU) provided with a laser diode and reflection mirrors, and exposes the charged surface of the photosensitive drums 13 according to image data to form electrostatic latent images according to the image data on the surface thereof.

The development apparatuses 12 develop the electrostatic latent images formed on the surface of the respective photosensitive drums 13 with toner of the colors, and form a toner image on the surface of the photosensitive drums 13. The drum cleaning apparatuses 14 respectively remove and collect toner remaining on the surface of the photosensitive drums 13 after development and image transfer.

The intermediate transfer belt apparatus 16 is disposed above the photosensitive drums 13, and is provided with an intermediate transfer belt 21, an intermediate transfer belt drive roller 22, an idler roller 23, four intermediate transfer rollers 24, and a belt cleaning apparatus 25.

The intermediate transfer belt 21 is formed as an endless belt using a film having a thickness of approximately 100 μm to 150 μm. The intermediate transfer belt drive roller 22, the idler roller 23, the intermediate transfer rollers 24, and the like support the intermediate transfer belt 21 in a tensioned manner, and revolve the intermediate transfer belt 21 in the direction of arrow C.

The intermediate transfer rollers 24 are rotatably supported in the vicinity of the intermediate transfer belt 21, and respectively pressed against the photosensitive drums 13 with interposition of the intermediate transfer belt 21.

The toner images on the surface of the photosensitive drums 13 are sequentially transferred and superimposed on the intermediate transfer belt 21, whereby a color toner image (toner images of the colors) is formed on the intermediate transfer belt 21. The toner images are transferred from the photosensitive drums 13 to the intermediate transfer belt 21, using the intermediate transfer rollers 24 pressed against the back surface of the intermediate transfer belt 21. The intermediate transfer rollers 24 are rollers each having a metal (for example, stainless steel) shaft having a diameter of 8 to 10 mm as a base, with the surface of that shaft being covered with a conductive elastic material (for example, such as EPDM or urethane foam). A high voltage transfer bias (a high voltage of opposite polarity (+) to the toner charging polarity (−)) is applied to the intermediate transfer rollers 24 in order to transfer toner images, and a high voltage is uniformly applied to recording paper with the conductive elastic material.

The toner images on the surface of the photosensitive drums 13 are layered on the intermediate transfer belt 21 in this way, and become a color toner image indicated by the image data. This color toner image is transported together with the intermediate transfer belt 21, and transferred onto recording paper in a nip region between the intermediate transfer belt 21 and a transfer roller 26a of a secondary transfer apparatus 26.

A voltage (a high voltage of opposite polarity (+) to the toner charging polarity (−)) for transferring the toner images of the colors on the intermediate transfer belt 21 to the recording paper is applied to the transfer roller 26a of the secondary transfer apparatus 26. In order to constantly obtain the nip region between the intermediate transfer belt 21 and the transfer roller 26a of the secondary transfer apparatus 26, either the transfer roller 26a or the intermediate transfer belt drive roller 22 is made of a hard material (such as metal), and the other is made of a soft material such as an elastic roller (such as an elastic rubber roller or a foam resin roller).

The toner images on the intermediate transfer belt 21 may not be completely transferred onto the recording paper by the secondary transfer apparatus 26, thus causing toner to remain on the intermediate transfer belt 21. This remaining toner causes toner color mixing to occur in a subsequent process. Accordingly, the belt cleaning apparatus 25 removes and collects the remaining toner. The belt cleaning apparatus 25 is provided with, for example, a cleaning blade that removes remaining toner by being in contact with the intermediate transfer belt 21 as a cleaning member. The back side of the intermediate transfer belt 21 is supported by the idler roller 23 at a site where the cleaning blade is in contact.

The recording paper is transported to the fixing apparatus 17 after the color toner image has been transferred thereto in the nip region between the intermediate transfer belt 21 and the transfer roller 26a of the secondary transfer apparatus 26. The fixing apparatus 17 is provided with a heat roller 31, a pressure roller 32, and the like, and sandwiches and transports the recording paper between the heat roller 31 and the pressure roller 32.

The heat roller 31 is controlled so as to have a predetermined fixing temperature based on the detection output of a temperature detector (not shown), and fuses, mixes, and applies pressure to the color toner image transferred onto the recording paper by applying heat and pressure to the recording paper together with the pressure roller 32, thus thermally fixing that color toner image on the recording paper.

The paper feed tray 18 is a tray for storing recording paper, which is provided in the lower part of the image forming apparatus 1, and feeds recording paper in the tray. Further, a manual feed tray 7 is a tray for placing recording paper, which is provided on the side wall of the image forming apparatus 1, and feeds recording paper in this tray.

The image forming apparatus 1 is provided with the paper transport path S having an S shape and used for feeding recording paper fed from the paper feed tray 18 or the manual feed tray 7 to the paper discharge tray 19 via the secondary transfer apparatus 26 and the fixing apparatus 17. Paper registration rollers 34, the fixing apparatus 17, transport rollers 35, paper discharge rollers 36, and the like are disposed along the paper transport path S.

A paper pickup roller 33 is provided at an edge portion of the paper feed tray 18, and recording paper is drawn out sheet-by-sheet from the paper feed tray 18 and transported to the paper transport path S by the paper pickup roller 33. Further, a pickup roller 8 is provided at an edge portion of the manual feed tray 7, and recording paper is drawn out sheet-by-sheet from the manual feed tray 7 and transported to the paper transport path S by the pickup roller 8.

The transport rollers 35 are small rollers for promoting and assisting the transport of recording paper, and a plurality of sets thereof are provided.

The paper registration rollers 34 temporarily stop the transported recording paper and align the leading edge of the recording paper, and then transport the recording paper in a timely manner in coordination with the rotation of the photosensitive drums 13 and the intermediate transfer belt 21 such that the color toner image on the intermediate transfer belt 21 is transferred onto the recording paper in the nip region between the intermediate transfer belt 21 and the transfer roller 26a of the secondary transfer apparatus 26.

Furthermore, the color toner image is fixed onto the recording paper by the fixing apparatus 17, and the recording paper passes through the fixing apparatus 17, and thereafter the recording paper is discharged facedown on the paper discharge tray 19 by the paper discharge rollers 36.

Further, if printing is performed not only on the front surface of recording paper, but also on the back surface, while the recording paper is being transported by the paper discharge rollers 36 on the paper transport path S, the paper discharge rollers 36 are stopped and then rotated in reverse, the front and back of the recording paper are reversed by causing the recording paper to pass through a reverse path Sr, and then the recording paper is guided to the paper registration rollers 34. As in the case of the front surface of the recording paper, an image is recorded and fixed onto the back surface of the recording paper, and the recording paper is discharged onto the paper discharge tray 19.

Figure 2:
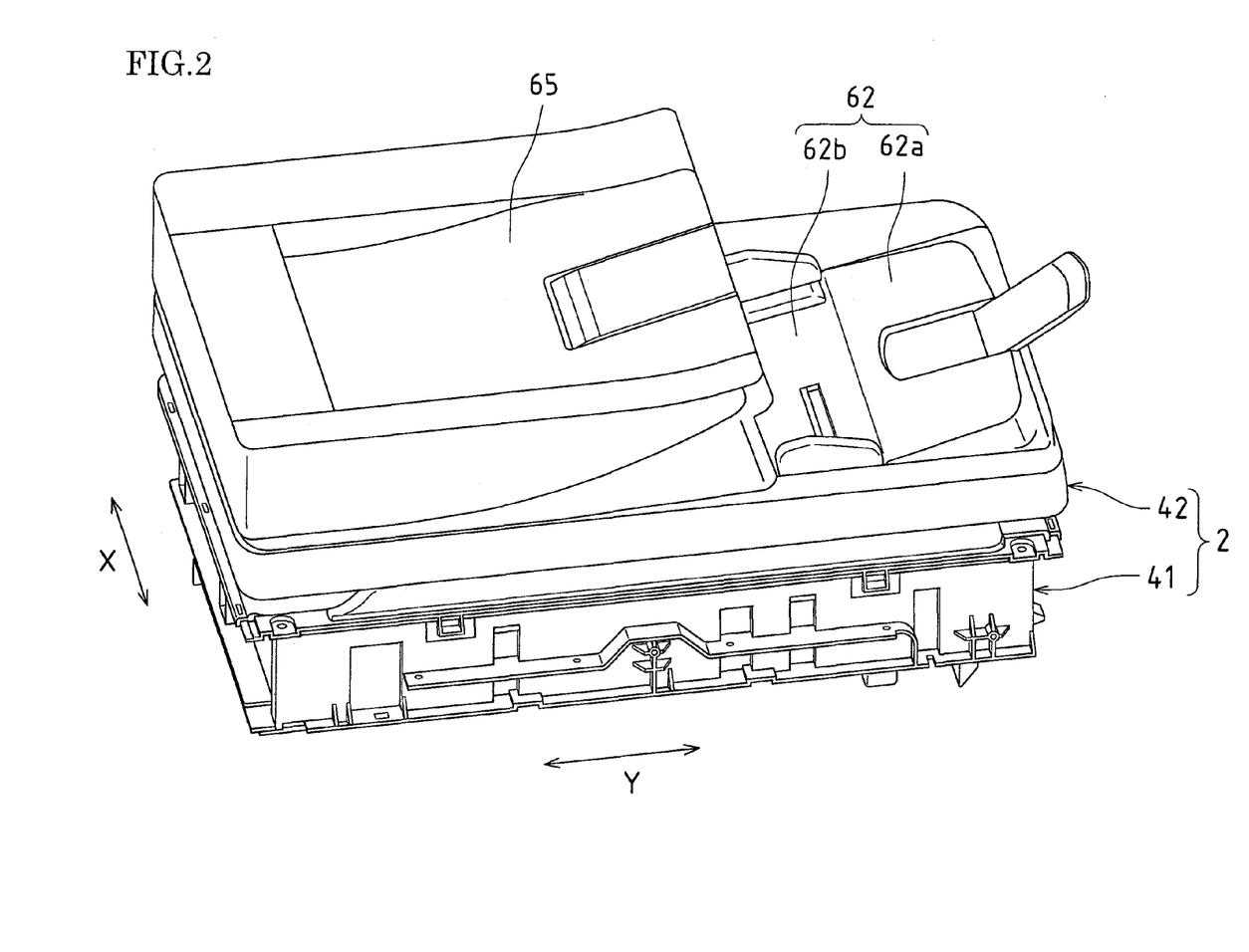
FIG. 2 is a perspective view showing the image reading apparatus provided at the upper body part of an image forming apparatus 1 in FIG. 1.
Figure 3:
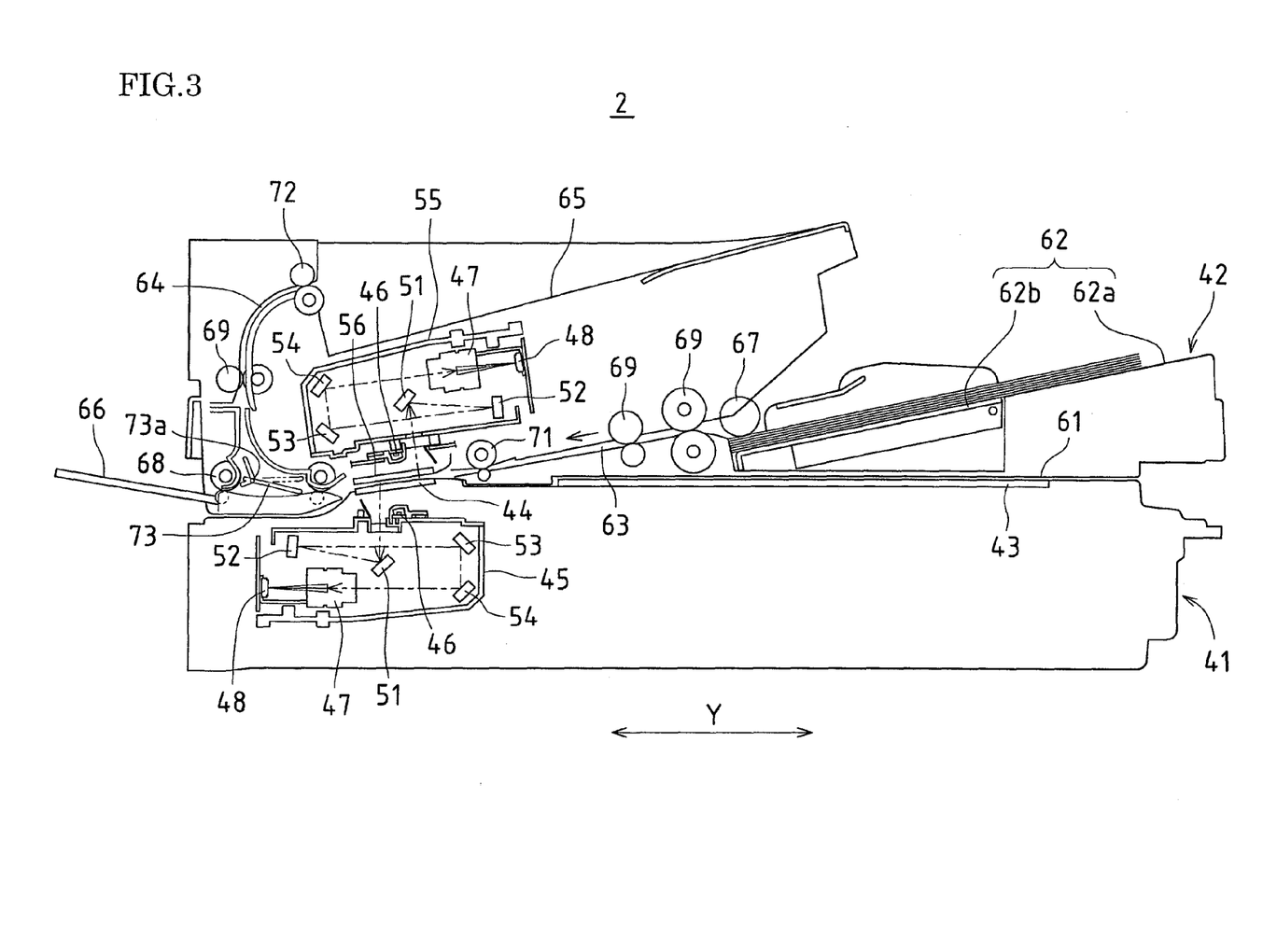
FIG. 3 is a cross-sectional view showing the image reading apparatus in FIG. 2.
Figure 4:
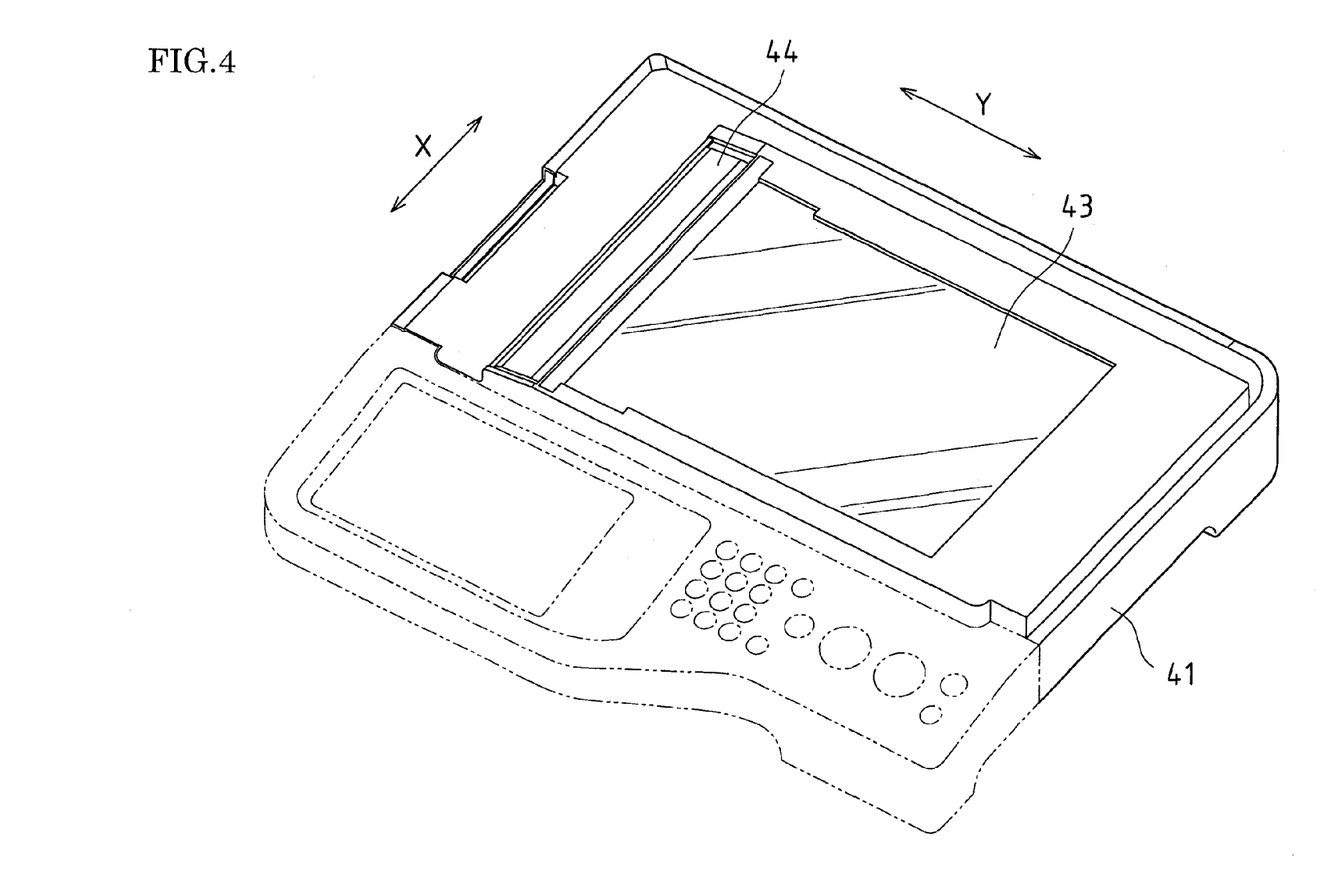
FIG. 4 is a perspective view showing a reading portion of the image reading apparatus in FIG. 2.

The following is a description of the image reading apparatus 2 provided at the upper body part of the image forming apparatus 1 in FIG. 1, with reference to FIGS. 2, 3, and 4. FIGS. 2 and 3 are a perspective view and a cross-sectional view showing the image reading apparatus 2. FIG. 4 is a perspective view showing a reading portion 41 of the image reading apparatus 2.

The image reading apparatus 2 is provided with the reading portion 41 on the lower side and an original transport portion 42 on the upper side. One far side of the original transport portion 42 on the upper side is pivotably supported by a hinge (not shown) on one far side of the reading portion 41 on the lower side, and the original transport portion 42 is opened and closed by the near portion thereof being raised or lowered. When the original transport portion 42 is opened, an original placement plate 43 and an original guide plate 44 of the reading portion 41 are uncovered as shown in FIG. 4. Both the original placement plate 43 and the original guide plate 44 are made of, for instance, a glass plate having translucency. An original is placed on the original placement plate 43, or is transported so as to pass over the original guide plate 44.

The reading portion 41 is provided with the original placement plate 43, the original guide plate 44, the first reading scanner 45, and the like. The first reading scanner 45 is provided with a light source 46, an imaging lens 47, a CCD (Charge Coupled Device) 48, first to fourth reflection mirrors 51 to 54, and the like. The first reading scanner 45 is moved under either the original placement plate 43 or the original guide plate 44, and reads an original placed on the original placement plate 43 (first reading mode) or reads an original that passes over the original guide plate 44 (second reading mode).

In the first reading mode, the first reading scanner 45 is moved under the original placement plate 43, the original transport portion 42 is opened, an original is placed on the original placement plate 43, and the original transport portion 42 is closed. Then, while the first reading scanner 45 is being moved in the sub-scanning direction Y by the distance according to the original size at a fixed speed, the original on the original placement plate 43 is illuminated by the light source 46, light reflected therefrom is sequentially reflected by the first to fourth reflection mirrors 51 to 54 so as to be guided to the imaging lens 47. The imaging lens 47 collects the light reflected from the original onto the CCD 48, and forms an image on the original surface on the CCD 48. The CCD 48 repeatedly scans the image on the original surface in the main scanning direction X, and outputs analog image signals for one main scanning line at each scan.

In the second reading mode, the first reading scanner 45 is moved under the original guide plate 44 and positioned, and the original transport portion 42 transports an original so as to cause the original to pass over the original guide plate 44 in the sub-scanning direction Y. When the original passes over the original guide plate 44, the light source 46 of the first reading scanner 45 illuminates the original surface via the original guide plate 44, light reflected from the original surface is sequentially reflected by the first to fourth reflection mirrors 51 to 54 of the first reading scanner 45 so as to be guided to the imaging lens 47, and the light reflected from the original surface is collected by the imaging lens 47 onto the CCD 48. Then, the image on the original surface is formed on the CCD 48, repeatedly scanned in the main scanning direction X by the CCD 48, and thereby read.

A second reading scanner 55 included in the original transport portion 42 can read an image on the back surface of an original. The second reading scanner 55 is disposed above the original guide plate 44, and is provided with a light source 46, an imaging lens 47, a CCD (Charge Coupled Device) 48, first to fourth reflection mirrors 51 to 54, and the like, as with the first reading scanner 45. When an original is transported in the sub-scanning direction Y by the original transport portion 42 and passes between the original guide plate 44 and the reading guide plate 56 (made of, for instance, a glass plate having translucency), the light source 46 of the second reading scanner 55 illuminates the original back surface via the reading guide plate 56, and light reflected therefrom is sequentially reflected by the first to fourth reflection mirrors 51 to 54 so as to be guided to the imaging lens 47. The imaging lens 47 collects the light reflected from the original back surface onto the CCD 48, and forms the image on the original back surface on the CCD 48. The CCD 48 repeatedly scans the image on the original back surface in the main scanning direction X, thereby reading the image on the original back surface.

Furthermore, it is also possible to read the front and back of the original that passes over the original guide plate 44 at the same time using the first and second reading scanners 45 and 55.

In this way, the images of the original read by the CCDs 48 of the first and second reading scanners 45 and 55 are outputted as analog image signals from the CCDs 48, and the analog image signals are A/D converted into digital image signals. Then, the digital image signals (image data) undergo various image processing, and are thereafter sent to and received by the light scanning apparatus 11 of the image forming apparatus 1. In the image forming apparatus 1, the images are recorded on recording paper, and this recording paper is outputted as a copied original.

The original transport portion 42 is provided with a bottom plate 61 that presses down an original on the original placement plate 43 when the original transport portion 42 is closed, an original tray 62 disposed above the bottom plate 61 and the original placement plate 43, a straight transport path 63 that linearly extends from the original tray 62 via the original guide plate 44, a curved transport path 64 that branches at a certain point of the straight transport path 63 and is curved upward, a first original discharge tray 65 provided on the end side of the curved transport path 64, a second original discharge tray 66 provided on the end side of the straight transport path 63, and the like.

The original tray 62 is provided with a fixed tray 62a and a rising/lowering tray 62b, and is inclined so as to be lower as approaching the straight transport path 63. An original is placed on the fixed tray 62a or the rising/lowering tray 62b, and the original on the leading edge side is placed on the rising/lowering tray 62b. The rising/lowering tray 62b includes a rising/lowering mechanism (not shown), and is normally at a low position. When an original is placed, the rising/lowering tray 62b rises until the leading edge of the original comes into contact with a pickup roller 67.

On the straight transport path 63, the pickup roller 67 is disposed at the starting end thereof, a discharge roller 68 is disposed at the end thereof, and a plurality of transport rollers 69 and a registration roller 71 are disposed at certain points thereof. Further, on the curved transport path 64, a discharge roller 72 is disposed at the end thereof, and a transport roller 69 is disposed at a certain point thereof. Furthermore, a switching claw 73 is disposed at the branch point of the straight transport path 63 and the curved transport path 64.

Normally, the switching claw 73 is rotated about a shaft 73a thereof in the clockwise direction and positioned as shown by the solid line. If the second reading mode is set in this state, and an original is placed on the original tray 62, the rising/lowering tray 62b rises until the leading edge of the original comes into contact with the pickup roller 67, the pickup roller 67 rotates, and the original is drawn out by the pickup roller 67 from the original tray 62 so as to be fed into the straight transport path 63. Along the straight transport path 63, the original is transported by the transport rollers 69, the leading edge of the original is aligned by abutting against the registration roller 71, and thereafter the original is transported between the original guide plate 44 and the reading guide plate 56 by the registration roller 71. Furthermore, the original is transported to the curved transport path 64 by the switching claw 73, and transported to and discharged onto the first original discharge tray 65 via the transport roller 69 and the discharge roller 72.

While the original is being transported in this way, the front or back surface of the original is read by the first reading scanner 45 or the second reading scanner 55.

When reading an image of a thick original (having a thickness of approximately 0.8 mm) such as a photograph, a postcard, a card, or a business card, the switching claw 73 is rotated about the shaft 73a thereof in the counter-clockwise direction and positioned as shown by the dotted line. If the second reading mode is set in this state, and a thick original is placed on the original tray 62, the rising/lowering tray 62b rises until the leading edge of the thick original comes into contact with the pickup roller 67, and the thick original is drawn out by the pickup roller 67 from the original tray 62 so as to be fed into the straight transport path 63. Along the straight transport path 63, the thick original is transported by the transport rollers 69, the leading edge of the thick original is aligned by abutting against the registration roller 71, and thereafter the thick original is transported between the original guide plate 44 and the reading guide plate 56 by the registration roller 71, and furthermore transported to and discharged onto the second original discharge tray 66 via the switching claw 73 and the discharge roller 68.

Since the straight transport path 63 has a substantially straight shape, jams and the like do not occur, and thus thick originals can be promptly transported.

In the original transport portion 42 as described, since an original on the original placement plate 43 and an original on the original guide plate 44 are read by the first reading scanner 45, original reading positions in the height direction at which an original on the original placement plate 43 and an original on the original guide plate 44 are read by the first reading scanner 45 are matched, which allows the first reading scanner 45 to be in focus at both original reading positions. Further, the original tray 62 is at a position higher than the original placement plate 43. The straight transport path 63 of the original transport portion 42 linearly extends from the original tray 62 at a position higher than the original placement plate 43 to the original guide plate 44 at the same height as that of the original placement plate 43. Accordingly, the straight transport path 63 is inclined so as to be lower on the original guide plate 44 side.

Figure 5A:
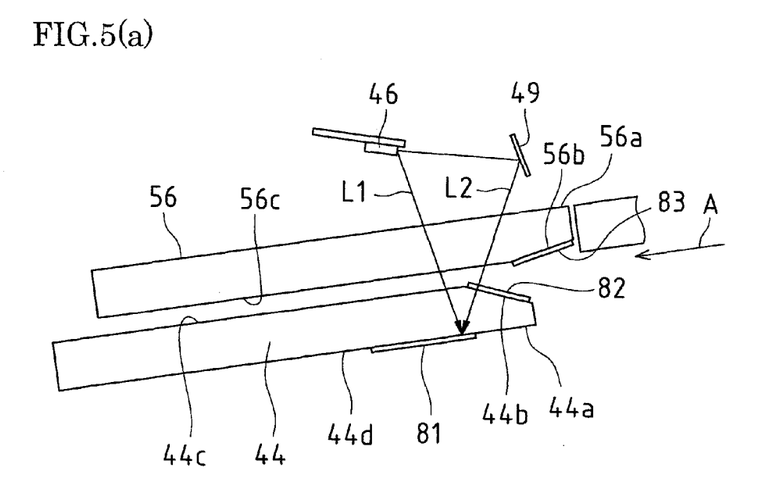

Accordingly, as shown in FIG. 5(*a*), the original guide plate 44 and the reading guide plate 56 that form a part of the straight transport path 63 are also inclined. Specifically, assuming that the upper surface of the original placement plate 43 on which the surface of an original is directly put serves as a reference, the original guide plate 44 and the reading guide plate 56 are inclined relative to the upper surface of the original placement plate 43.

Figure 5B:
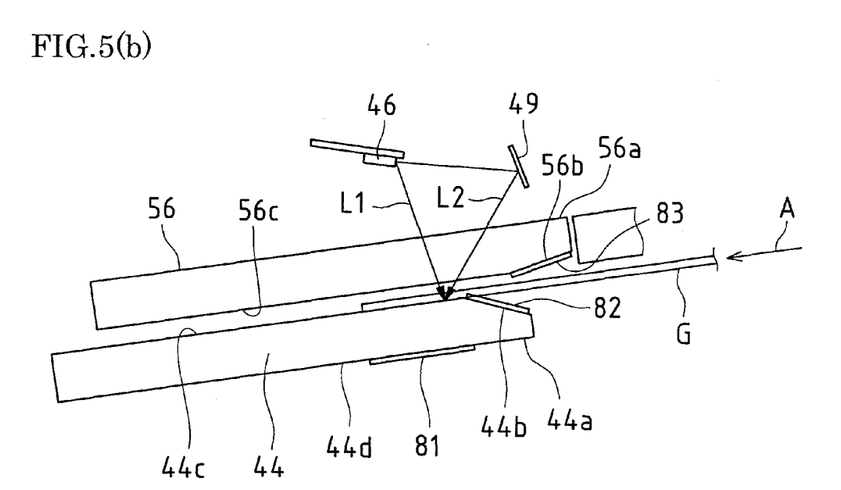

Here, in FIG. 5(*a*), an inclined surface (C surface) 44*b* is formed at an edge portion 44*a* of the original guide plate 44 facing the upstream side of the original transport direction A, and a transparent sheet 82 is attached onto the inclined surface 44*b*. The inclined surface 44*b* and the transparent sheet 82 are provided in order to receive the leading edge of a transported original G and promptly guide the original to an upper surface 44*c* of the original guide plate 44 as shown in FIG. 5(*b*).

Similarly, an inclined surface (C surface) 56*b* is also formed at an edge portion 56*a* of the reading guide plate 56 facing the upstream side of the original transport direction A, and a transparent sheet 83 is attached onto the inclined surface 56*b*. The leading edge of the transported original G is received by the inclined surface 56*b* and the transparent sheet 83, and promptly guided to a lower surface 56*c* of the reading guide plate 56.

The inclined surface 44*b* of the original guide plate 44 and the inclined surface 56*b* of the reading guide plate 56 as described are ground glass-like or frosted glass-like. If the ground glass-like inclined surfaces 44*b* and 56*b* were exposed and used as they are, the original would be chipped by the ground glass-like inclined surfaces 44*b* and 56*b*, and a large amount of paper powder would be generated. This paper powder may adhere to the upper surface 44*c* of the original guide plate 44 and the lower surface 56*c* of the reading guide plate 56, be read by the first and second reading scanners 45 and 55, and appear as black streaks of an original image, which will be a cause of the deterioration of image quality.

Further, assuming that as shown in FIG. 5(*a*), a white reference plate 81 for shading correction is provided on a lower surface 44*d* of the original guide plate 44, and illumination light L2 emitted from the light source 46 of the second reading scanner 55 and reflected by a reflecting plate 49 is incident on the white reference plate 81 through the ground glass-like inclined surface 44*b*, the illumination light L2 is diffused by the ground glass-like inclined surface 44*b*, and thus the illumination level at the white reference plate 81 falls. On the contrary, as shown in FIG. 5(*b*), the illumination light L2 emitted from the light source 46 and reflected by the reflecting plate 49 is incident on the transported original G without passing through the ground glass-like inclined surface 44*b*, and thus the illumination level at the original G will not fall.

Accordingly, the illumination level at which the white reference plate 81 is illuminated by the illumination light L2 and the illumination level at which the original G is illuminated by the illumination light L2 differ, and the former illumination level is lower. Accordingly, the tone of the white reference plate 81 read by the CCD 48 of the second reading scanner 55 is dark, which does not allow shading correction to be performed accurately.

Note that since illumination light L1 emitted from the light source 46 is incident on the white reference plate 81 and the original G without passing through the ground glass-like inclined surface 44*b*, the illumination level at which the white reference plate 81 is illuminated by the illumination light L1 and the illumination level at which the original G is illuminated by the illumination light L1 are the same. However, problems occur in shading correction due to the mere fall of the illumination level at the white reference plate 81 by the other illumination light L2.

In view of this, in the image reading apparatus 2 of the present embodiment, the transparent sheet 82 is attached onto the inclined surface 44*b* of the original guide plate 44, and similarly the transparent sheet 83 is attached onto the inclined surface 56*b* at the edge portion 56*a* of the reading guide plate 56, thereby preventing an original from being chipped by the ground glass-like inclined surfaces 44*b* and 56*b*, and the illumination light L2 from being diffused by the ground glass-like inclined surface 44*b*.

The transparent sheets 82 and 83 are each obtained by uniformly applying an adhesive onto the back surface of a transparent synthetic resin sheet (transparent sheet). The transparent synthetic resin sheets may be made of any material, as long as the sheets have excellent translucency and a smooth surface. Further, the adhesive may be made of any material, as long as the adhesive has excellent translucency and adhesiveness.

For example, sheets that are each obtained by applying an acrylic pressure sensitive adhesive onto a transparent PET (Polyethylene Terephthalate) sheet (transparent 50-SN manufactured by NICHIEI KAKOH CO., LTD., for instance) are applicable as the transparent sheets 82 and 83.

If the inclined surface 44*b* of the original guide plate 44 and the inclined surface 56*b* of the reading guide plate 56 are covered with the transparent sheets 82 and 83 as described, an original comes into contact with the surface of the transparent sheets 82 and 83 and slides thereon without coming into direct contact with the ground glass-like inclined surfaces 44*b* and 56*b*. Thus, the original will not be chipped by the ground glass-like inclined surfaces 44*b* and 56*b*, and consequently paper powder will not be generated.

Figure 6A:
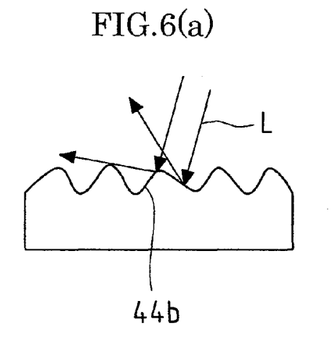
Figure 6B:
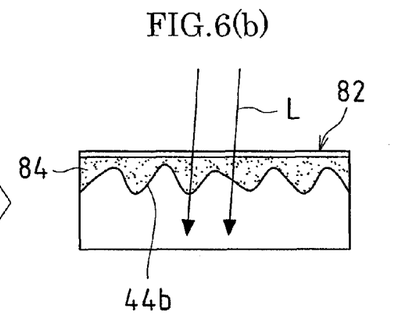

In the case where incident light L is incident on the ground glass-like inclined surface 44*b* of the original guide plate 44 as shown in FIG. 6(*a*), even if the incident light L is reflected and diffused by fine depressions and projections formed in/on the ground glass-like inclined surface 44*b*, by attaching the transparent sheet 82 onto the inclined surface 44*b*, as shown in FIG. 6(*b*), an adhesive 84 on the back surface of the transparent sheet 82 fills the depressions and projections of the inclined surface 44b so as to uniformly adhere thereto, which prevents the incident light L from being reflected by the depressions and projections. Since the refractive index of the adhesive 84 is close to the refractive index of glass, the incident light L passes through the boundary surface between the adhesive 84 and the inclined surface 44b, and will not be reflected by the depressions and projections.

Accordingly, as shown in FIG. 5(a), the illumination light L2 emitted from the light source 46 of the second reading scanner 55 and reflected by the reflecting plate 49 passes through the transparent sheet 82 and the inclined surface 44b, and illuminates the white reference plate 81 brightly. Accordingly, the tone of the white reference plate 81 read by the CCD 48 of the second reading scanner 55 is maintained at a bright level, which allows shading correction to be performed accurately.

Figure 7A:
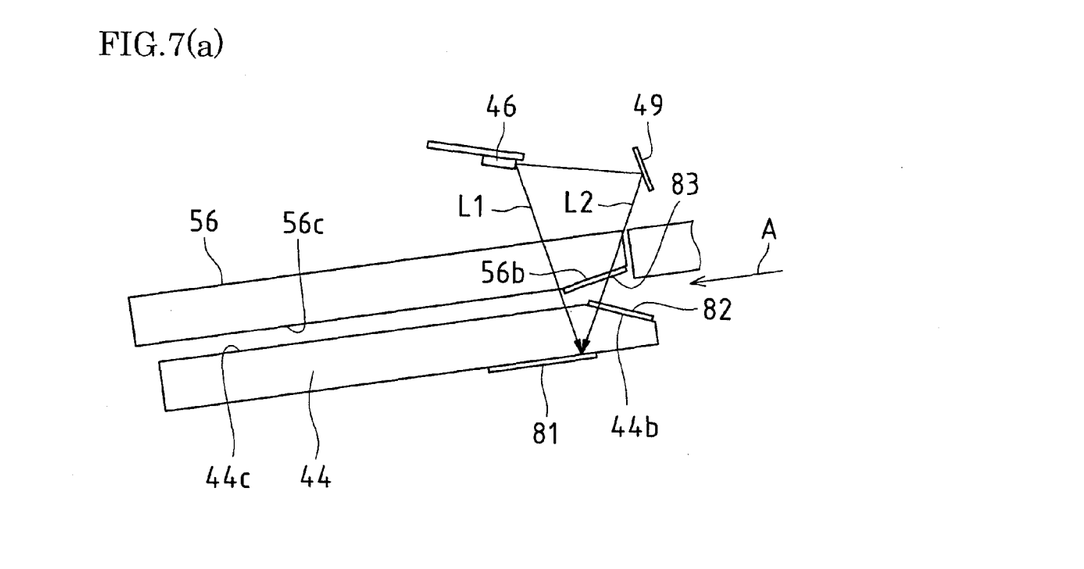
Figure 7B:
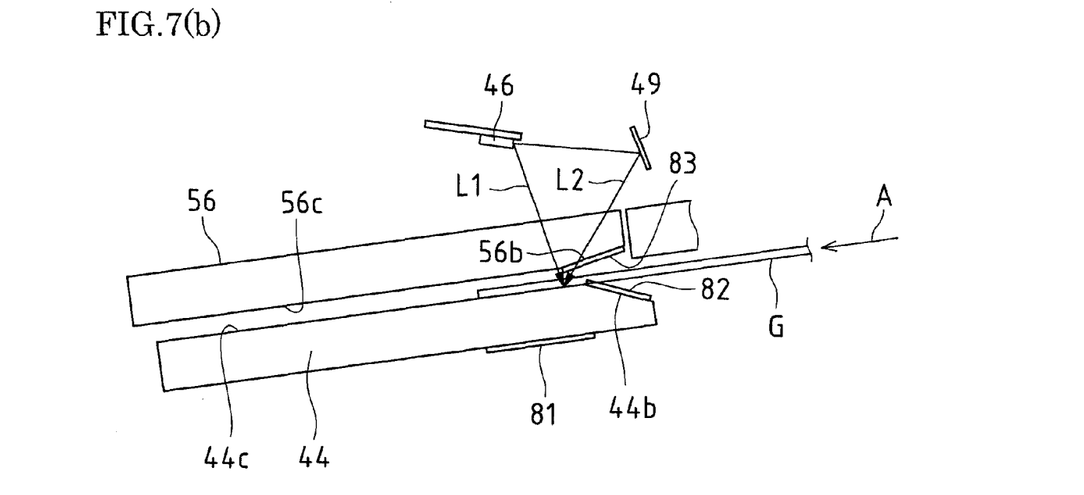

Also, by attaching the transparent sheet 83 onto the inclined surface 56b of the reading guide plate 56, an adhesive on the back surface of the transparent sheet 83 fills depressions and projections of the inclined surface 56b, and incident light passes through the boundary surface between the adhesive on the transparent sheet 83 and the inclined surface 56b, and thus the incident light will not be reflected by the depressions and projections. Accordingly, even if a configuration is adopted in which the illumination light L2 emitted from the light source 46 of the second reading scanner 55 and reflected by the reflecting plate 49 passes through the inclined surface 56b, the transparent sheet 83, the transparent sheet 82, and the inclined surface 44b so as to be incident on the white reference plate 81 as shown in FIG. 7(a), and also the illumination light L2 passes through the inclined surface 56b and the transparent sheet 83 so as to be incident on the original G as shown in FIG. 7(b), the white reference plate 81 and the original G are illuminated at the same illumination level, and thus shading correction can be accurately performed.

Figures 8A, 8B:
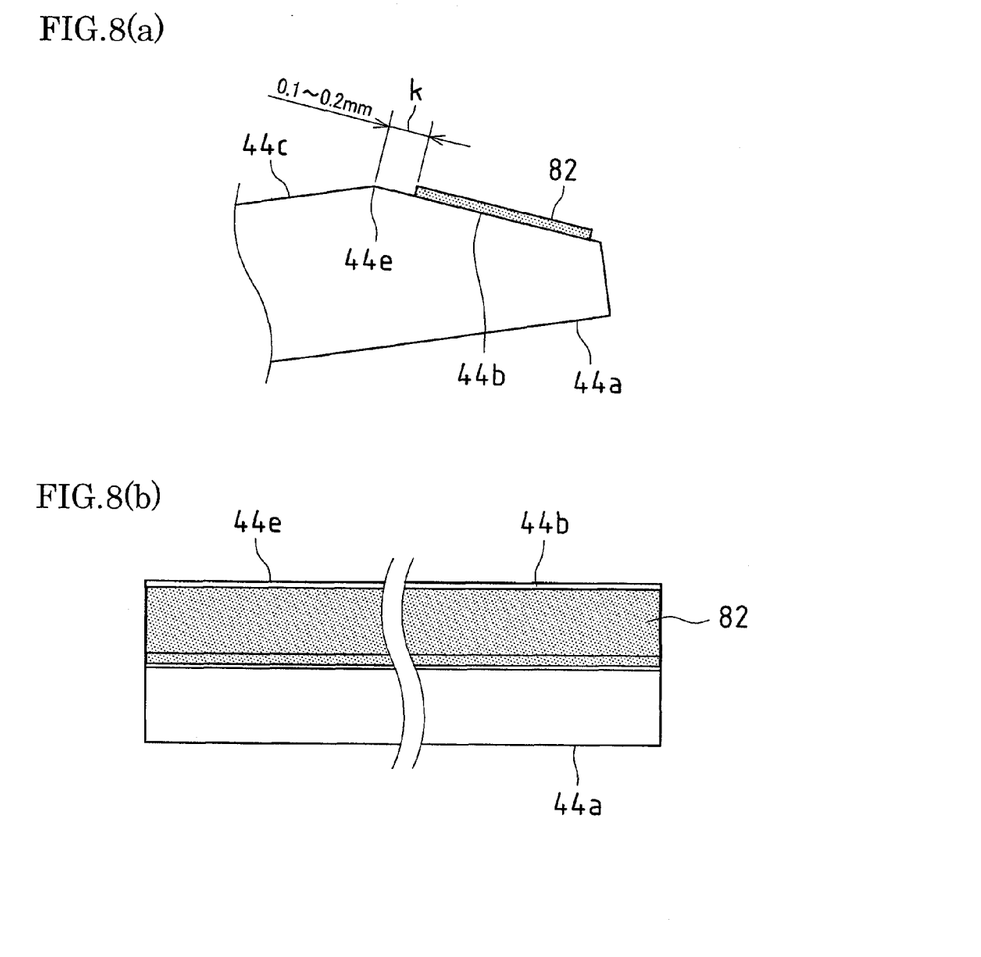

FIGS. 8(a) and 8(b) are a lateral view and a front view showing an enlarged state in which the transparent sheet 82 adheres to the inclined surface 44b of the original guide plate 44.

As shown in FIGS. 8(a) and 8(b), the transparent sheet 82 is attached onto the inclined surface 44b, being separated from a boundary line 44e between the inclined surface 44b and the upper surface 44c of the original guide plate 44 by a predetermined interval k (0.1 to 0.2 mm). In this case, even if the adhesive 84 on the transparent sheet 82 exudes, the adhesive 84 will not reach the upper surface 44c of the original guide plate 44 over the boundary line 44e, and thus the upper surface 44c of the original guide plate 44 will not be smeared with the adhesive 84.

It is also preferable that the transparent sheet 83 is attached onto the inclined surface 56b, being separated from the boundary line between the inclined surface 56b and the lower surface 56c of the reading guide plate 56 by the predetermined interval k, for the same reason.

Figure 9:
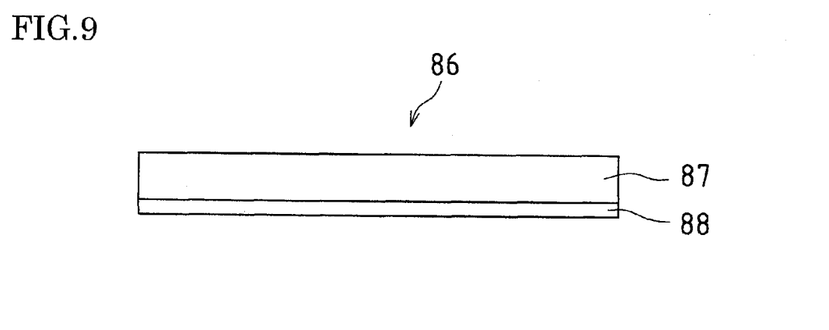
FIG. 9 is a cross-sectional view showing a modified example of the transparent sheet.

FIG. 9 shows a modified example of a transparent sheet. A transparent sheet 86 of this modified example is obtained by sticking a transparent double-sided tape 88 onto the back surface of a transparent synthetic resin sheet 87. The transparent synthetic resin sheet 87 may be made of any material, as long as the sheet has excellent translucency and a smooth surface. Further, the double-sided tape 88 may be made of any material, as long as an adhesive with excellent translucency and adhesiveness is uniformly applied on both sides of the base material thereof with excellent translucency. For example, a tape obtained by applying an acrylic pressure sensitive adhesive onto both sides of a transparent PET sheet is applicable as the double-sided tape 88.

Alternatively, a tape that does not have a base material and is made of an adhesive layer with excellent translucency may be applied as the double-sided tape 88.

The transparent sheet 86 as described is attached onto the inclined surface 44b of the original guide plate 44 or the inclined surface 56b of the reading guide plate 56 with interposition of the double-sided tape 88.

The foregoing described a preferred embodiment and a modified example of the present invention with reference to the accompanying drawings, but it goes without saying that the present invention is not limited to these examples. It is apparent that those skilled in the art can conceive various modified examples or revised examples within the scope defined by the appended claims, and naturally such examples also fall within the technical scope of the present invention.

What is claimed is:

1. An image reading apparatus, comprising:
a first glass plate having translucency over which an original is transported and caused to pass; and
an image reading portion that reads the original by illuminating the original via the first glass plate;
wherein a first inclined surface of the first glass plate for guiding the transported original to an upper surface of the first glass plate includes ground glass depressions and projections at an edge portion of the first glass plate, and a transparent sheet is attached onto the first inclined surface with interposition of a transparent adhesive or a transparent double-sided tape.

2. The image reading apparatus according to claim 1, further comprising:
a second glass plate having translucency that forms a pair with the first translucent plate,
wherein a second inclined surface includes ground glass depressions and projections at an edge portion of a lower surface of the second glass plate, a transparent sheet is attached onto the second inclined surface with interposition of a transparent adhesive or a transparent double-sided tape, and
the first glass plate and the second glass plate are arranged in opposition at a distance from each other, and the original is transported and caused to pass between the first glass plate and the second glass plate.

3. The image reading apparatus according to claim 1, wherein illumination light of the image reading portion passes through at least one of the first inclined surface and the second inclined surface, and illuminates the original or a white reference member for shading correction that faces the first glass plate.

4. The image reading apparatus according to claim 1, wherein the transparent sheet is attached, being separated from a boundary line between the upper surface and the first inclined surface of the first glass plate by a predetermined interval, and the transparent sheet is attached, being separated from a boundary line between the lower surface and the second inclined surface of the second glass plate by the predetermined interval.

5. An image forming apparatus including the image reading apparatus according to claim 1.

6. An image forming apparatus including the image reading apparatus according to claim 2.

7. An image forming apparatus including the image reading apparatus according to claim 3.

8. An image forming apparatus including the image reading apparatus according to claim 4.

9. The image reading apparatus according to claim 2, wherein illumination light of the image reading portion passes through at least one of the first inclined surface and the second inclined surface, and illuminates the original or a white reference member for shading correction that faces the first glass plate.

10. The image reading apparatus according to claim 2, wherein the transparent sheet is attached, being separated from a boundary line between the upper surface and the first inclined surface of the first glass plate by a predetermined interval, and the transparent sheet is attached, being separated from a boundary line between the lower surface and the second inclined surface of the second glass plate by the predetermined interval.

\* \* \* \* \*